United States Patent
Matsumoto et al.

(10) Patent No.: US 6,185,114 B1
(45) Date of Patent: Feb. 6, 2001

(54) ISOLATING DC-DC CONVERTER

(75) Inventors: Tadahiko Matsumoto, Yokohama; Jun Nagai, Sagamihara, both of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/507,041

(22) Filed: Feb. 18, 2000

(30) Foreign Application Priority Data

Mar. 5, 1999 (JP) .................................................. 11-057833

(51) Int. Cl.$^7$ ................................................. H02M 3/335
(52) U.S. Cl. ................................................. 363/21; 363/127
(58) Field of Search ................. 363/20, 21, 125, 363/127, 131

(56) References Cited

U.S. PATENT DOCUMENTS

| | | | |
|---|---|---|---|
| 5,724,235 | * | 3/1998 | Shimamori et al. .................... 363/21 |
| 5,726,869 | * | 3/1998 | Yamashita et al. ..................... 363/21 |
| 5,999,420 | * | 12/1999 | Aonuma et al. ......................... 363/21 |
| 6,011,703 | * | 1/2000 | Boylan et al. ........................... 363/21 |
| 6,038,148 | * | 3/2000 | Farrington et al. ..................... 363/21 |
| 6,040,986 | * | 3/2000 | Sakamoto et al. ...................... 363/20 |
| 6,044,002 | * | 3/2000 | Van Der Wal et al. ................ 363/97 |
| 6,049,471 | * | 4/2000 | Korcharz et al. ....................... 363/20 |
| 6,069,802 | * | 5/2000 | Priegnitz .................................. 363/21 |

FOREIGN PATENT DOCUMENTS 3-235668 * 2/1990 (JP) .

* cited by examiner

*Primary Examiner*—Adolf Daneke Berhane
(74) *Attorney, Agent, or Firm*—Ostrolenk, Faber, Gerb & Soffen, LLP (57) ABSTRACT

An isolating DC—DC converter has a main switching element disposed on the primary side of a main transformer and a synchronous rectifier disposed on the secondary side thereof. The synchronous rectifier is turned off by synchronizing to the turn-on of the main switching element and is turned on by synchronizing to the turn-off the main switching element. The isolating DC—DC converter has a drive transformer connected to a charging circuit of the main switching element, the drive transformer outputting a pulse when an ON signal of a control pulse driving the main switching element is outputted, and an early-off drive circuit receiving the pulse of the drive transformer to turn off the synchronous rectifier before the main switching element is turned on.

15 Claims, 6 Drawing Sheets

ISOLATING DC-DC CONVERTER

BACKGROUND OF THE INVENTION

1. Field of the Invention

The present invention relates to isolating DC—DC converters used for switching power supplies, the converters outputting constant voltages.

2. Description of the Related Art

Figure 11:
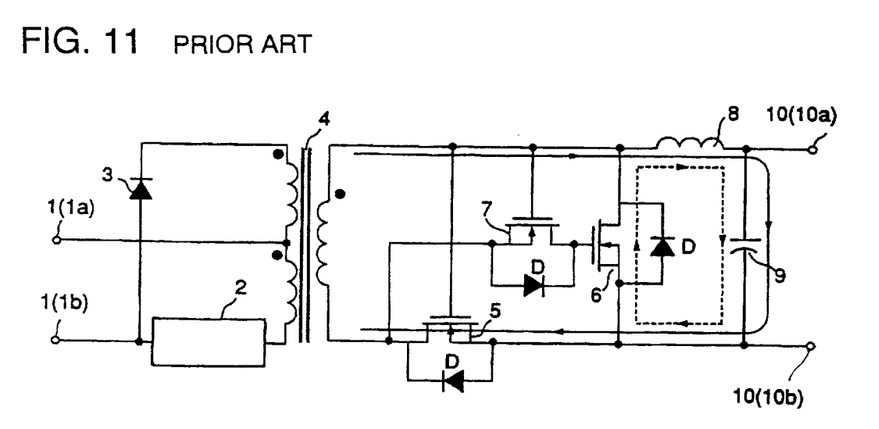
FIG. 11 is a circuit diagram of a conventional isolating DC—DC converter.

As constant-voltage outputting circuits, isolating DC—DC converters are known. FIG. 11 shows a conventional circuit of a forward-converter type, which is disclosed in Japanese Unexamined Patent Publication No. 3-235668.

In this figure, reference numeral 1 denotes an input terminal, reference numeral 1a denotes (+) input, reference numeral 1b denotes (−) input, reference numeral 2 denotes a main switching element, reference numeral 3 denotes a diode, reference numeral 4 denotes a main transformer, reference numeral 5 denotes a synchronous rectifier (a rectifying-side synchronous rectifier) which is electrically connected when the main switching element 2 is turned on, reference numeral 6 denotes a synchronous rectifier (a commutating-side synchronous rectifier) which is electrically connected when the main switching element 2 is turned off, reference numeral 7 denotes a drive switching element of the commutating-side synchronous rectifier 6, reference numeral 8 denotes a choke coil, reference numeral 9 denotes a capacitor, and reference character D denotes a parasitic diode of each element. In addition, reference numeral 10 denotes an output terminal, reference numeral 10a denotes (+) output, reference numeral 10b denotes (−) output, and the switching elements 2, 5, 6, and 7 are N-channel MOS FETs.

In this circuit, DC power inputted from the input terminal 1 is converted into AC power by the switching operation of the main switching element 2. During an ON-period of the main switching element 2, the AC power is coupled to the secondary-side circuit by the main transformer 4. The AC power is rectified by the synchronous rectifiers 5 and 6 a DC power and filtered by the choke coil 8 and the capacitor 9 to be outputted from the output terminal 10.

The rectifying-side synchronous rectifier 5 and the drive switching element 7 are driven to be turned on when the main switching element is turned on by changes in a voltage of the main transformer 4 occurring due to the switching operation of the main switching element 2. Therefore, during the ON-period of the main switching element 2, on the secondary side of the main transformer 4, current flows in a path indicated by the solid line shown in the figure, and electromagnetic energy is charged in the choke coil 8, by which an output voltage is provided at the output terminal 10.

When the main switching element 2 is turned off and a reset pulse is generated in the main transformer 4, the input capacitance of the commutating-side synchronous rectifier 6 is charged via a parasitic diode D of the drive switching element 7, by which the commutating-side synchronous rectifier 6 is turned on. Even if the reset of the main transformer 4 is completed in the course of the OFF-period of the main switching element 2 and the reset pulse disappears, the drive switching element 7 maintains the OFF-period until the main switching element 2 is turned on. Thus, since the path for releasing the charge of the input capacitance of the synchronous rectifier 6 is closed during the OFF-period of the drive switching element 7, the commutating-side synchronous rectifier 6 maintains the ON-state. During the OFF-period of the main switching element 2, since current flows over a path indicated by the dotted line shown in the figure by electromagnetic energy charged in the choke coil 8, an output voltage is outputted from the output terminal 10.

In the above conventional circuit, the ON/OFF operation of the rectifying-side synchronous rectifier 5 is synchronized to the ON/OFF operation of the main switching element 2. In addition, since the commutating-side synchronous rectifier 6 can be turned on over the entire OFF-period of the main switching element 2 by providing the drive switching element 7, circuit efficiency can be improved.

In the conventional circuit, the rectifying-side synchronous rectifier 5 and the drive switching element 7 can be turned on by synchronizing to the turn-on of the main switching element 2. However, after the turn-on of the drive switching element 7, charge of the input capacitance of the commutating-side synchronous rectifier 6 passes through the drive switching element 7 to be discharged, by which the commutating-side synchronous rectifier 6 is turned off. As a result, there is a time lag of a few tens of nsc until the commutating-side synchronous rectifier 6 is turned off after the turn-on of the drive switching element 7. With this time lag, since the commutating-side synchronous rectifier 6 remains in an ON-state shortly after the main switching element 2 is turned on and the rectifying-side synchronous rectifier 5 is turned on, the secondary coil of the main transformer 4 is short-circuited. With the short-circuit phenomenon, a large amount of short-circuit current flows over a path sequentially passing through the secondary coil of the main transformer 4, the commutating-side synchronous rectifier 6, the rectifying-side synchronous rectifier 5, and the secondary coil of the main transformer 4.

The short-circuit current flows during the OFF-period of the commutating-side synchronous rectifier 6 after the turn-on of the rectifying-side synchronous rectifier 5. The flow of the short-circuit current produces large conductive losses and noises which are not negligible. Thus, primarily, although improvement in circuit efficiency is intended to be achieved by synchronizing the operations of the rectifiers 5 and 6 to the ON/OFF operation of the main switching element 2, the conductive losses due to the short-circuit current deteriorates the circuit efficiency, and the occurrence of noises worsens the performance of circuit operations.

Particularly, since the conductive losses due to the short-circuit current increases in proportion to the switching frequency of the main switching element 2, the conventional circuit has a disadvantage in terms of obtaining a higher switching frequency in order to reduce the size of a DC—DC converter.

SUMMARY OF THE INVENTION

The present invention can solve the aforementioned conventional problems and provides an isolating DC—DC converter which reduces conductive losses by turning on the synchronous rectifier substantially in the entire OFF-period of the main switching element and is capable of being made compact while obtaining a higher switching frequency, in which circuit efficiency is improved and a lower noise is obtained by preventing the turn-off of the synchronous rectifier from delaying when the main switching element is turned on so as to eliminate the short-circuit current.

The isolating DC—DC converter comprises a main switching element disposed on the primary side of a main transformer and a synchronous rectifier disposed on the secondary side thereof. The synchronous rectifier is turned off by synchronizing to the turn-on of the main switching element and is turned on by synchronizing to the turn-off the main switching element. The isolating DC—DC converter has such an arrangement that there are provided a drive transformer connected to a charging circuit of the main switching element, the drive transformer outputting a pulse when an ON signal of a control pulse driving the main switching element is outputted, and an early-off drive circuit receiving the pulse of the drive transformer to turn off the synchronous rectifier before the main switching element is turned on. With this structure, since the synchronous rectifier is already turned off before the main switching element is turned on, it can be prevented that a short-circuit path passing through the synchronous rectifier is formed on the secondary side of the main transformer, due to a delay in turning off the synchronous rectifier.

With this arrangement, since it is possible to prevent a large amount of short-circuit current from flowing over a path passing through the synchronous rectifier occurring due to a delay in turning off the synchronous rectifier, the occurrence of a large conductive loss caused by the flow of short-circuit current and the problem of a noise source stemming from the short-circuit current can be prevented. As a result, the present invention can provide an isolating DC—DC converter with high circuit efficiency and noiseless high performance.

Furthermore, since the losses of circuit operations are small, low loss high-frequency operations can be performed, in which it is possible to sufficiently meet the market demand for a high-frequency isolating DC—DC converter which is compact and lightweight, low in cost and losses, having high performance and reliability, regarded as futuristic targets.

Furthermore, since there is provided a structure in which the turn-on operation of the synchronous rectifier turned off by the early-off drive circuit is performed by a reset pulse of the main transformer, the synchronous rectifier can be maintained in an ON-state over substantially the entire region of an OFF-period of the main switching element. Thus, efficiency in the circuit operations during the OFF-period of the main switching element can be achieved.

Furthermore, the invention provides a structure in which a totem-pole circuit is disposed on the primary side of the main transformer to amplify an auxiliary power supply output and apply to the primary coil of the drive transformer when an ON output of a control pulse for controlling the turn-on/turn-off of the main switching element is sent (when an ON signal is outputted), and a structure in which an instantaneous short-circuit operation circuit for instantaneously short-circuiting the input capacitance of the main switching element before the main switching element turns on to increase the output of the drive transformer is disposed on the primary side of the main transformer. With these structures, an output large enough to turn off the synchronous rectifier can be supplied to the early-off drive circuit from the drive transformer. This arrangement permits the synchronous rectifier to be properly turned off before the main switching element is turned on, by which the reliability of circuit operations for preventing a delay in turning off the synchronous rectifier can be improved.

Furthermore, the invention provides a structure in which charge of the input capacitance of the synchronous rectifier passes through the drive switching element in an ON-state to be released, by which the synchronous rectifier is turned off; and a pulse-width expanding circuit expanding the pulse of the drive transformer turning on the drive switching element to apply to the drive switching element is disposed in an early-off drive circuit, by which the drive switching element is properly turned on even if the width of a pulse outputted from the drive transformer is narrow, and the charge of the input capacitance of the synchronous rectifier is immediately released to properly turn off the synchronous rectifier before the main switching element is turned on. Accordingly, the reliability of circuit operations for preventing a delay in turning off the synchronous rectifier can be improved.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Figure 1:
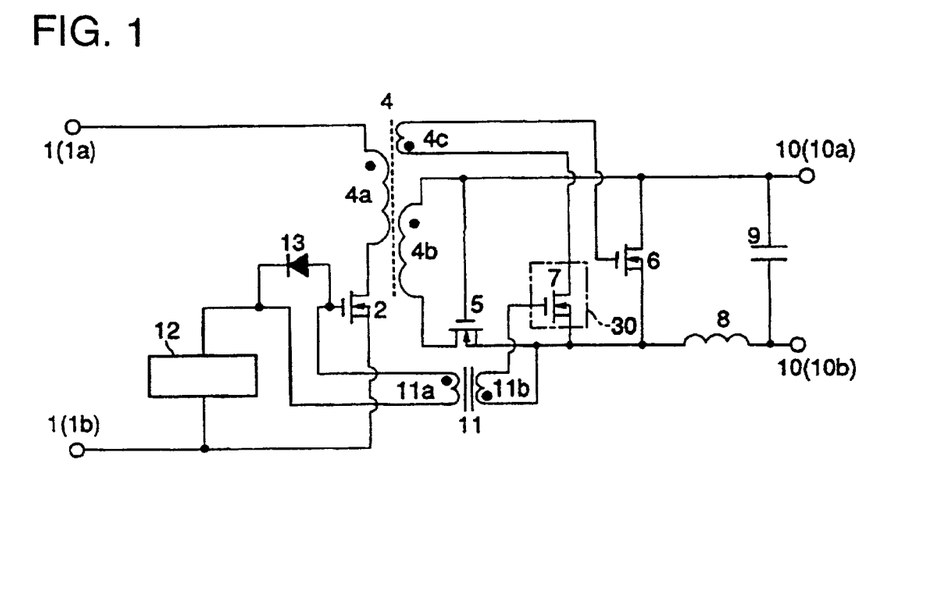
FIG. 1 is a circuit diagram of an isolating DC—DC converter according to a first embodiment of the present invention.
Figure 2:
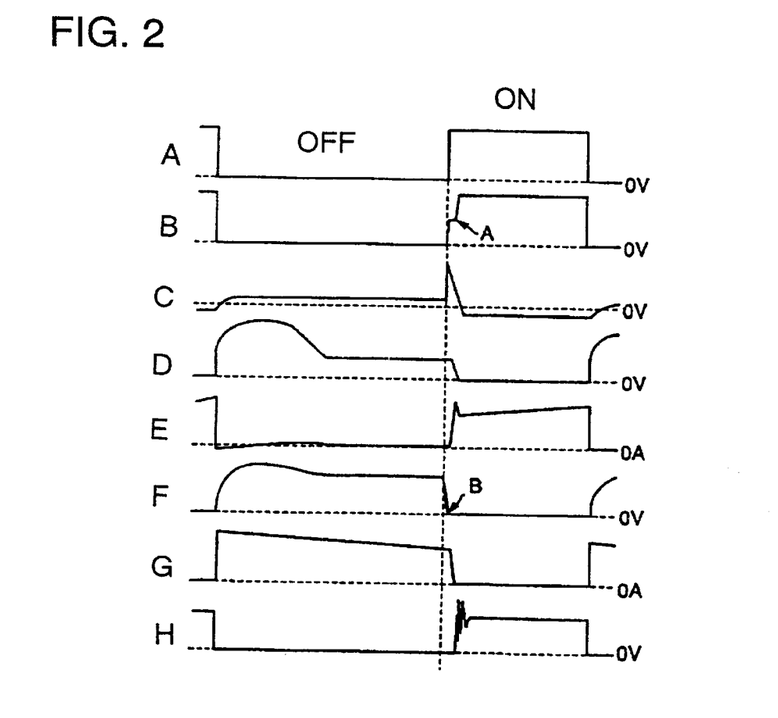
FIG. 2 is a waveform illustration of the main circuit part of the first embodiment.

A description will be given of embodiments of the present invention by referring to the drawings. In the illustration of each embodiment, including the example of conventional art, the same reference numerals are given to the same circuit-forming components, and the explanation thereof is omitted or simplified. FIG. 1 shows the circuit structure of an isolating DC—DC converter according to a first embodiment of the present invention, and FIG. 2 shows the main operational waveform of the isolating DC—DC converter. The isolating DC—DC converter is a resonance reset forward converter type, in which DC power is applied to input terminals 1. Reference numeral 1a of the input terminals 1 denotes an input terminal on the (+) side, and reference numeral 1b denotes an input terminal on the (−) side.

The input terminal 1a is connected to the end for starting winding the primary coil 4a of a main transformer 4. The end for finishing winding the primary coil 4a is connected to the drain of a main switching element 2 formed by a MOS FET. The source of the main switching element 2 is connected to the side of the input terminal 1b. The gate of the main switching element 2 is connected to the first end (end for starting winding) of the primary winding 11a of a drive transformer 11. A PWM (pulse width modulation) control circuit (a pulse-width control circuit) 12 is disposed between the other end (end for finishing winding) of the winding the primary winding 11a and the input terminal 1b. As an equivalent circuit, a series LC resonant circuit is formed by an excitation inductance L of the primary coil 11a and an input capacitance C of the main switching element 2. In addition, a DC auxiliary power supply driving the PWM control circuit 12 is disposed on the primary side of the main transformer 4, although this is not shown in FIG. 1.

The PWM control circuit 12 is a rectangular wave circuit for outputting a control pulse to the main switching element 2. A path extending from the output end of the PWM control circuit 12 to the gate of the main switching element 2 via the primary coil 11a of the drive transformer 11 forms a path for charging the input capacitance of the main switching element 2. A diode 13 is connected between both ends of the primary coil 11a, in which the anode side of the diode 13 is the side of the first end of the primary winding 11a (the side of the gate of the main switching element 2).

The main transformer 4 includes a primary coil 4a, a secondary coil 4b, and a tertiary coil 4c wound on a common core, in which the first end of the secondary winding 4b is connected to the gate of a synchronous rectifier (a rectifying-side synchronous rectifier) 5. The drain of the synchronous rectifier 5 is connected to the other end of the secondary winding 4b.

Furthermore, the first end of the secondary winding 4b is connected to the drain of a synchronous rectifier (a commutating-side synchronous rectifier) 6 comprising a MOS FET switching element. The gate of the commutating-side synchronous rectifier 6 is connected to the other end of the tertiary winding 4c. The first end of the tertiary winding 4c is connected to the drain of a drive switching element 7 comprising a MOS FET. The gate of the drive switching element 7 is connected to the other end of the secondary winding 11b of the drive transformer 11. The first end of the secondary winding 11b, the source end of the drive switching element 7, the source end of the commutating-side synchronous rectifier 6, and the source end of the rectifying-side synchronous rectifier 5 are connected to a common conductive line.

One end of a choke coil 8 is connected to a common source-end side of the rectifying-side synchronous rectifier 5, the commutating-side synchronous rectifier 6, and the drive-switching element 7. The other end of the choke coil 8 is connected to one end of a capacitor 9, whose other end is connected to a common connecting conductive line connecting the end of the secondary winding 4b, the gate of the rectifying-side synchronous rectifier 5, and the drain of the commutating-side synchronous rectifier 6. Both ends of the capacitor 9 form output terminals 10, in which reference numeral 10a denotes the (+) side output terminal, and reference numeral 10b denotes the (−) side output terminal. As is evident from the figure, each of the switching elements 2, 5, 6, and 7 is an N-channel MOS FET.

The isolating DC—DC converter of the first embodiment has the above-described structure, in which, as in the case of the conventional example, a DC power inputted from the input terminal 1 is converted into an AC power by the switching operation of the main switching element 2, and is coupled to the secondary side of the main transformer 4 from the primary side thereof. Furthermore, on the secondary side of the main transformer 4, the AC power is rectified to DC power by the synchronous rectifiers 5 and 6, and filtered by the choke coil 8 and the capacitor 9 to be outputted to a load from the output terminals 10.

In the embodiment, it is unique that there is provided a special circuit turning off the commutating-side synchronous rectifier 6 before the main switching element 2 is turned on, when an ON signal of a control pulse is sent to the main switching element 2 from the PWM controlling circuit 12. In this embodiment, the special circuit comprises the drive transformer 11 and an early-off drive circuit 30. In the first embodiment, the drive switching element 7 serves as the early-off drive circuit 30.

Next, a description will be given of the characteristic operations of the drive transformer 11 and the early-off drive circuit 30. First, when the ON signal of a control pulse, as shown by waveform A in FIG. 2, is outputted from the PWM controlling circuit 12, the ON signal is sent to the primary coil 11a of the drive transformer 11 and the input capacitance of the main switching element 2 through a charging path. After receiving the ON signal of the control pulse, the input capacitance of the main switching element 2 starts to be charged. Meanwhile, when the ON signal is received at the primary coil 11a of the drive transformer 11, a pulse voltage that is enough to charge the input capacitance of the drive switching element 7, as shown by waveform C in FIG. 2, is instantaneously excited at the secondary coil 11b of the drive transformer 11. The reset pulse is produced from a series LC resonance comprises the excitation inductance L of the primary coil 11a and the input capacitance C of the main switching element 2. In addition, for example, an ON signal of a control pulse having a low frequency such as 800 Hz is converted into a high-frequency reset pulse signal.

The input capacitance of the drive switching element 7 receiving the pulse voltage of the secondary coil 11b instantaneously finishes charging to turn on the drive switching element 7. When the drive switching element 7 turns on, the charge of the input capacitance of the commutating-side synchronous rectifier 6 is released through a charging path passing the tertiary coil and the drive switching element 7. The releasing of the charge permits the commutating-side synchronous rectifier 6 to be turned off (in which a point B of waveform F in FIG. 2 is a position for turning off), before the main switching element 2 reaches a charging potential for turning on, (in which a point A of waveform B in FIG. 2 is a position for turning on).

Thus, since the commutating-side synchronous rectifier 6 is already turned off before the main switching element 2 is turned on to allow the rectifying-side synchronous rectifier 5 to be turned on, when the rectifying-side synchronous rectifier 5 is turned on, the secondary coil 4b of the main transformer 4 is not short-circuited by the commutating-side synchronous rectifier 6. As a result, the problems of the conventional circuits can be completely solved, i.e., a short-circuit current does not flow in the secondary side of the main transformer 4 due to a delay in turning off the commutating-side synchronous rectifier 6. Accordingly, conductive losses decrease and noise is reduced.

During the ON-period of the main switching element 2, current flows over a path sequentially passing through the secondary coil 4b, the capacitor 9, the choke coil 8, the rectifying-side synchronous rectifier 5, and the secondary coil 4b, by which a DC output from the output terminal 10 is provided to a load (not shown).

In addition, when an off-signal of a control pulse from the PWM controlling circuit 12 is provided to the main switching element 2 through the charging path, since the charge of the input capacitance of the switching element 2 is released onto the side of the input terminal 1b (the ground side) via the PWM controlling circuit 12, the main switching element 2 is turned off. In this situation, the polarities of the main transformer 4 and the drive transformers 11 are reversed, in which the rectifying-side synchronous rectifier 5 is turned off and the commutating-side synchronous rectifier 6 is turned on by a reset pulse generated from the main transformer 4 (by synchronizing to the reset pulse). Although the commutating-side synchronous rectifier 6 is turned on by a reset pulse supplied from the tertiary coil 4c, even if the reset pulse disappears during the OFF-period of the main switching element 2, since the drive switching element 7 is turned off, the path for releasing the charge of the input capacitance of the commutating-side synchronous rectifier 6 is in a closed state. As a result, since the commutating-side synchronous rectifier 6 maintains the ON-state substantially over the entire OFF-period of the main switching element 2, it is possible to improve circuit efficiency during the OFF-period of the main switching element 2.

In addition, since there is provided a structure in which a turn-on signal of the commutating-side synchronous rectifier 6 is provided from the tertiary coil 4c, when the number of turns of the tertiary coil 4c is most appropriately designed, an advantage can be obtained that a turn-on drive voltage of the commutating-side synchronous rectifier 6 can be set to be the most appropriate voltage.

During the OFF-period of the main switching element 2, current of the electromagnetic energy of the choke coil 8 flows over a path sequentially passing through the choke coil 8, the commutating-side synchronous rectifier 6, the capacitor 9, and the choke coil 8, by which a DC voltage from the output terminal 10 is provided to a load. In addition, in this embodiment, as in the case of the conventional art, the output (voltage) of the main transformer 4 is detected. In order to make the output fixed, the PWM controlling circuit 12 controls the pulse width of a control pulse.

Figure 3:
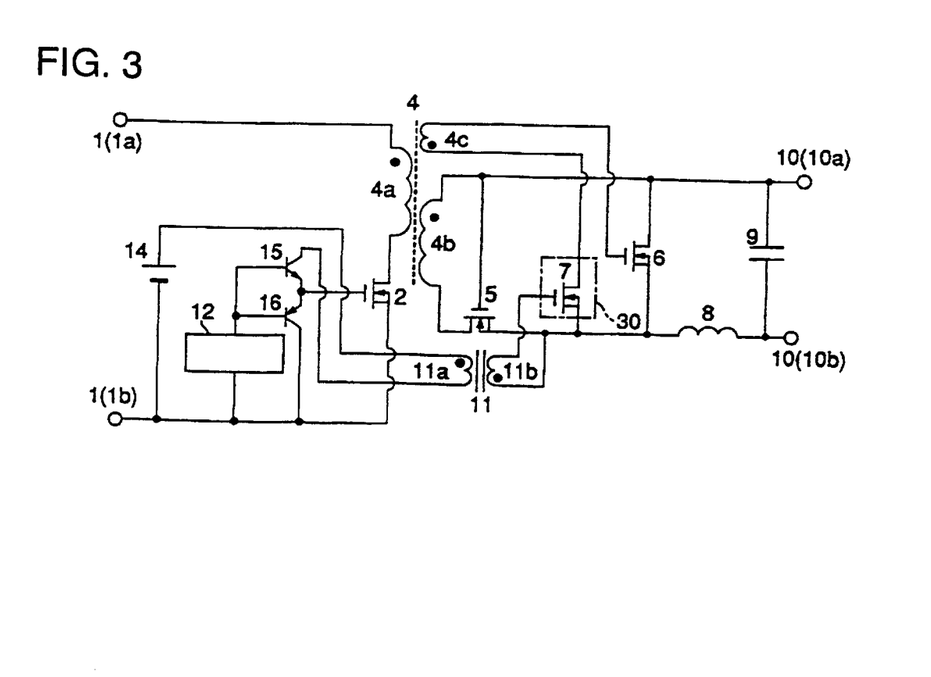
FIG. 3 is a circuit diagram of an isolating DC—DC converter according to a second embodiment of the present invention.

FIG. 3 shows the circuit structure of an isolating DC—DC converter according to a second embodiment of the present invention. In this second embodiment, unlike the case of the first embodiment, a totem-pole circuit is connected to the path for charging the main switching element 2, and the diode 13 is omitted. The other structural parts are the same as those in the first embodiment.

In FIG. 3, the negative pole of an auxiliary power supply 14 is connected to the input terminal 1b, and the positive pole of the auxiliary power supply 14 is connected to the first end of the primary coil 11a of the drive transformer 11. A totem-pole circuit is formed by connecting the emitter of an npn transistor 15 to the emitter of a pnp transistor 16. The node of the emitters of both transistors 15 and 16 is connected to the gate of the main switching element 2, and the bases of the transistors 15 and 16 are connected to the output end of the PWM controlling circuit 12. In addition, the collector of the npn transistor 15 is connected to the other end (end for finishing winding) of the primary coil 11a, and the collector of the pnp transistor 16 is connected to the input terminal 1b.

A path sequentially passing from the positive pole of the auxiliary power supply 14 through the primary coil 11a and the npn transistor 15 to the gate of the main switching element 2 is the path for charging the input capacitance of the main switching element 2. Furthermore, a path passing from the gate of the main switching element 2 through the pnp transistor 16 to the input terminal 1b is the path for discharging the input capacitance of the main switching element 2.

In the second embodiment, when an ON signal of a control pulse from the PWM controlling circuit 12 is provided to the bases of the npn transistor 15 and the pnp transistor 16, the npn transistor 15 is turned on, whereas the pnp transistor 16 is turned off. As a result, the DC power of the auxiliary power supply 14 is applied to the primary coil 11a of the drive transformer 11 and the input capacitance of the main switching element 2 via the charging path, and as in the case of the first embodiment, the commutating-side synchronous rectifier 6 can be turned off before the main switching element 2 is turned on, which leads to the same advantages given in the first embodiment. Since the totem-pole circuit has a current amplifying function, there is an advantage in that a larger current can be applied to the primary coil 11a of the main transformer 4.

Figure 4:
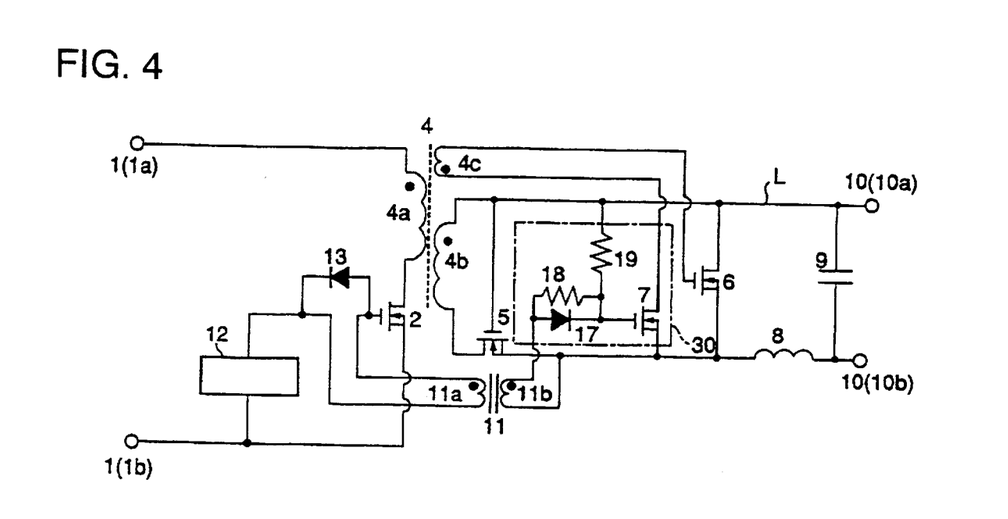
FIG. 4 is a circuit diagram of an isolating DC—DC converter according to a third embodiment of the present invention.

FIG. 4 shows the circuit structure of a third embodiment of the present invention. In this third embodiment, unlike the case in the first embodiment shown in FIG. 1, an early-off drive circuit 30 comprises a drive switching element 7 and a pulse-width expanding circuit. The other structural parts are the same as those in the first embodiment. As in the case of the first embodiment, the drive switching element 7 is disposed on a path for discharging the commutating-side synchronous rectifier 6. The pulse-width expanding circuit comprises a diode 17 and resistors 18 and 19. The pulse-width expanding circuit is connected between the end for finishing winding the secondary coil 11b of the drive transformer 11 and the gate of the drive switching element 7.

In other words, the anode of the diode 17 is connected to the end for finishing winding the secondary coil 11b, and the cathode of the diode 17 is connected to the gate of the drive switching element 7. In addition, the diode 17 is connected in parallel to the resistor 18, and the node of the cathode of the diode 17 and the gate of the drive switching element 7 is connected to one end of the resistor 19. The other end of the resistor 19 is connected to a positive-side output line L connecting the end for starting winding the secondary coil 4b of the main transformer 4 and the output terminal 10a.

The third embodiment is characterized by a structure in which the width of a reset pulse (a pulse outputted from the secondary coil 11b when an ON signal of a control pulse is outputted from the PWM controlling circuit 12) provided from the secondary coil 11b of the drive transformer 11 is expanded to apply to the gate of the drive switching element 7.

Figure 5:
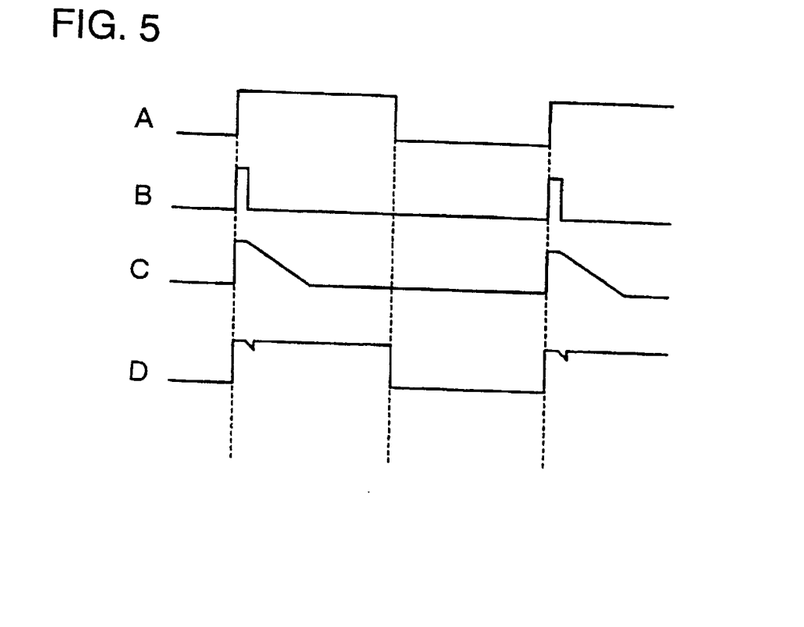
FIG. 5 is a waveform illustration of operations of a pulse-width expanding circuit in the circuit shown in FIG. 4.

FIG. 5 shows a situation of expanding the reset pulse, in which waveform A shows a control pulse outputted form the PWM controlling circuit 12, and waveform B shows a reset pulse outputted from the secondary coil 11b of the drive transformer 11. In addition, waveform C shows the waveform of the reset pulse expanded only by the resistor 18, and waveform D shows the waveform of the reset pulse expanded both by the resistors 18 and 19.

In this way, since the pulse-width expanding circuit expands the width of the reset pulse to send the reset pulse to the gate of the drive switching element 7, the drive switching element 7 can maintain an ON-state over the expanded pulse-width period. As a result, since the time for releasing the charge of the input capacitance of the commutating-side synchronous rectifier 6 becomes longer, releasing of the input-capacitance charge is properly performed, with the result that an advantage can be obtained that the turn-off of the commutating-side synchronous rectifier 6 can be performed without fail.

When no pulse-width expanding circuit is provided, if the width of the reset pulse is narrow, the ON-period of the drive switching element 7 is shortened. As a result, before the charge of the input capacitance of the commutating-side synchronous rectifier 6 is completely released, the drive switching element 7 is turned off and the discharging path is thereby cut off, which leads to a problem that the turn-off operation of the commutating-side synchronous rectifier 6 cannot be normally performed. Since the third embodiment includes the pulse-width expanding circuit, such a problem does not occur. Accordingly, in the third embodiment, the turn-off operation of the commutating-side synchronous rectifier 6 can be properly performed with reliability.

According to an experiment conducted in developing the present invention, expansion of a reset pulse can be sufficiently performed only by the resistor 18 of the resistors 18 and 19, and the resistor 19 can be omitted.

The other operations in the third embodiment are the same as those in the first embodiment, and the same advantage as those obtained in the first embodiment can be obtained in the third embodiment.

Figure 6:
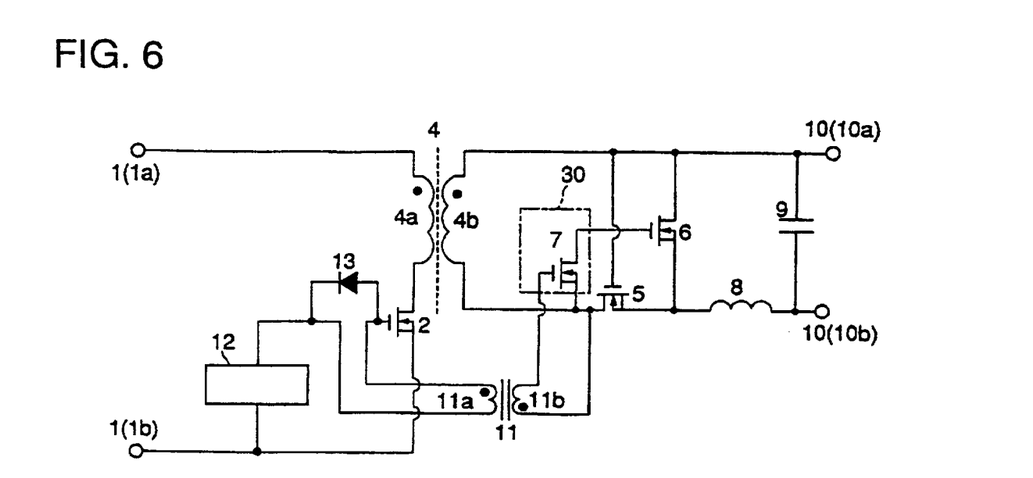
FIG. 6 is a circuit diagram of an isolating DC—DC converter according to a fourth embodiment of the present invention.

FIG. 6 shows a fourth embodiment of the present invention. In the fourth embodiment, unlike the case of the first embodiment, in order to simplify the structure of the main transformer 4, the tertiary coil 4c turning on the commutating-side synchronous rectifier 6 is omitted, and the commutating-side synchronous rectifier 6 is turned on by using the secondary coil 4b of the main transformer 4. As a result, the drain of the drive switching element 7 is connected to the gate of the commutating-side synchronous rectifier 6.

The other structural parts are the same as those in the first embodiment, and the same operations as those in the first embodiment permits the same advantages provided by the prevention of a short-circuit current to be obtained as in the case of the first embodiment.

Figure 7:
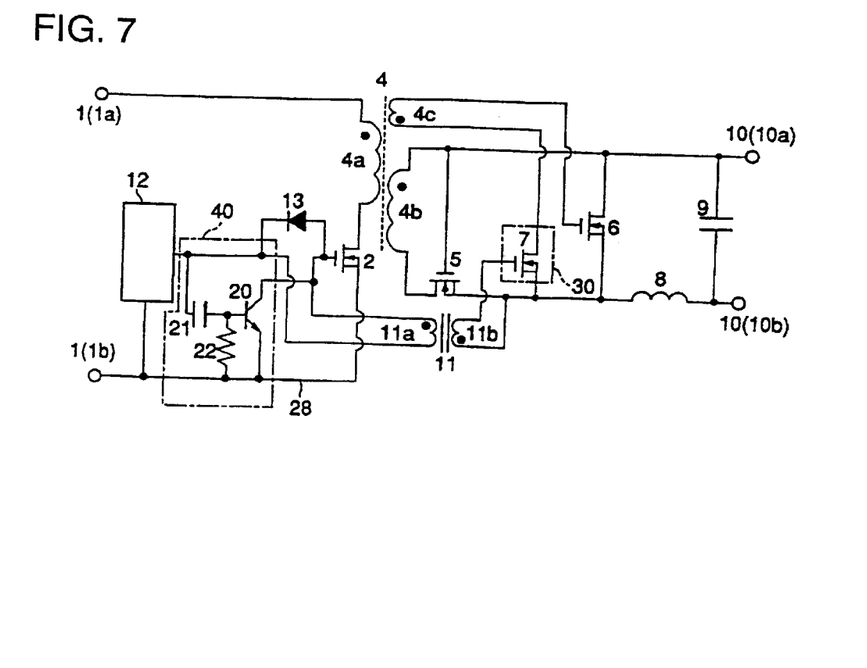
FIG. 7 is a circuit diagram of an isolating DC—DC converter according to a fifth embodiment of the present invention.

FIG. 7 shows an isolating DC—DC converter according to a fifth embodiment of the present invention. In this embodiment, unlike the case of the first embodiment, on the primary side of a main transformer 4, there is provided an instantaneous short-circuit operation circuit for increasing the output voltage of a reset pulse of a drive transformer 11. The other structural parts are the same as those in the first embodiment. The characteristic instantaneous short-circuit operation circuit comprises an npn transistor 20, a capacitor 21, and a resistor 22.

One end of the capacitor 21 is connected to the output end of a PWM controlling circuit 12, and the other end of the capacitor 21 is connected to the base of the npn transistor 20. The emitter of the npn transistor 20 is connected to a conductive line 28 connecting the source of a main switching element 2 and an input terminal 1b. In addition, the collector of the npn transistor 20 is connected to the charging path of a section connecting the primary coil 11a of the drive transformer 11 and the gate of the main switching element 2. One end of the resistor 22 is connected to a conductive path connecting the capacitor 21 and the gate of the npn transistor 20, and the other end of the resistor 22 is connected to the conductive line 28.

The above-described instantaneous short-circuit operation circuit 40 has a circuit structure which can solve a problem in that, when an ON signal from the PWM controlling circuit 12 is outputted, since the input capacitance of the main switching element 2 is small, it is difficult to produce a voltage large enough to turn on the drive switching element 7 in the drive transformer 11.

In other words, the capacitor 21 and the resistor 22 forms a differential circuit. When the ON signal from the PWM controlling circuit 12 is outputted, the differential circuit turns on the npn transistor 20 only during the time of a few tens of nano seconds before the main switching element 2 is turned on after charging of the input capacitance of the main switching element 2, by which the input capacitance (between the gate and the source) of the main switching element 2 is short-circuited. With this short-circuiting, a large voltage (current) can be instantaneously supplied to the primary coil 11a of the drive transformer 11, and then, a pulse voltage large enough to turn on the drive switching element 7 is outputted from the secondary coil 11b of the drive transformer 11 so that the commutating-side synchronous rectifier 6 can be turned off without fail before the main switching element 2 is turned on. In addition, in this circuit, since charging of the input capacitance is not performed when the input capacitance (between the gate and the source) of the main switching element 2 is short-circuited, an advantage can be obtained that the time in which the input capacitance of the main switching element 2 is charged tip to a turn-on potential after outputting the ON-signal of a control pulse from the PWM controlling circuit 12 can be delayed.

Figure 8:
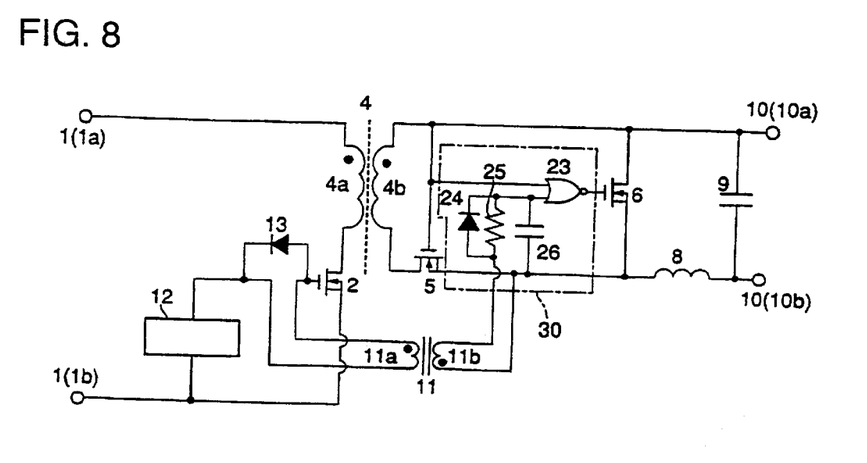
FIG. 8 is a circuit diagram of an isolating DC—DC converter according to a sixth embodiment of the present invention.

FIG. 8 shows a sixth embodiment of the present invention. In the sixth embodiment, unlike the case of the first embodiment, an early-off drive circuit 30 is formed by using a logic circuit, and the other structural parts are the same as those in the first embodiment. The early-off drive circuit 30 in the sixth embodiment includes a NOR gate 23 as a logic element, a diode 24, a resistor 25, and a capacitor 26.

The output end of the NOR gate 23 is connected to the gate of a commutating-side synchronous rectifier 6, and one input end of the NOR gate 23 is connected to a conductive path connecting the gate of a rectifying-side synchronous rectifier 5 and the end for starting winding the secondary coil 4b of a main transformer 4. In addition, the other input end of the NOR gate 23 is connected to the end for finishing winding the secondary coil 11b of a drive transformer 11 via a parallel circuit comprising the diode 24 and the resistor 25. The cathode of the diode 24 is oriented to the side of the NOR gate 23. One end of the capacitor 26 is connected to the source sides of the synchronous rectifiers 5 and 6, and the other end thereof is connected to an input terminal of the NOR gate 23 on the side where the parallel circuit comprising the diode 24 and the resistor 25 is connected.

In the sixth embodiment, when an ON signal of a control pulse is outputted from a PWM controlling circuit 12 and a reset pulse is thereby generated at the secondary coil 11b of the drive transformer 11, the NOR gate 23 receives the reset pulse to turn off the commutating-side synchronous rectifier 6 before a main switching element 2 is turned on. As a result, as in the case of each embodiment described above, the occurrence of short-circuited current due to the delay in turning off the commutating-side synchronous rectifier 6 can be prevented, which leads to high efficiency in circuit operations and noise reduction. In the circuit of this embodiment, it is also possible to turn off the commutating-side synchronous rectifier 6 by a H-level output occurring at the secondary coil 4b of the main transformer 4, when the main switching element 2 is turned on. However, in an actual circuit operation, since a reset pulse appears at the secondary coil 11b of the drive transformer 11 earlier than the H-level output appears at the secondary coil 4b of the main transformer 4, the turn-off operation of the commutating-side synchronous rectifier 6 is performed by the reset pulse of the secondary coil 11b.

The circuit section comprising the diode 24, the resistor 25, and the capacitor 26, which is incorporated in the early-off drive circuit 30 of this embodiment, has a function to expand the width of the reset pulse occurring at the drive transformer 11 to send the pulse to the NOR gate 23. In the example shown in FIG. 8, although a logic element comprising the NOR gate 23, a circuit turning off the commutating-side synchronous rectifier 6 is formed as a circuit incorporated in the early-off drive circuit 30 by using an appropriate logic element such as an inverter or a NAND gate.

Figure 9:
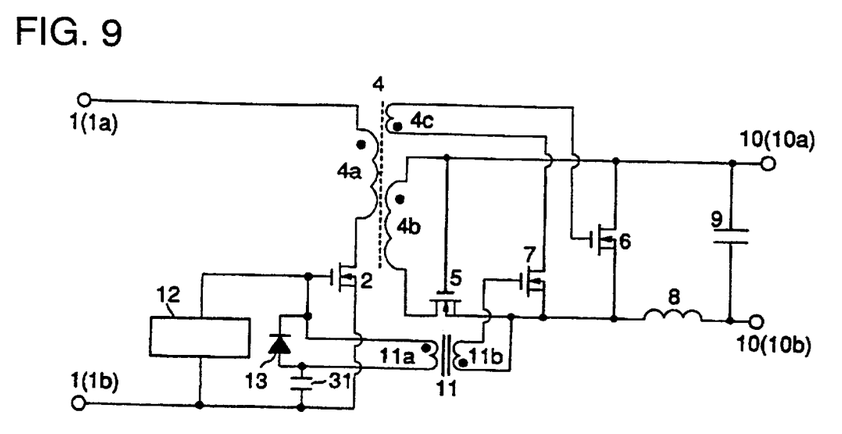
FIG. 9 is a circuit diagram of an isolating DC—DC converter according to a seventh embodiment of the present invention.

FIG. 9 shows an isolating converter according to a seventh embodiment of the present invention. In each of the first to sixth embodiments, as an equivalent circuit, the input capacitance (parasitic capacitance) of the main switching element 2 is connected in series to the primary coil 11a of the drive transformer 11, and the input capacitance is used to produce a pulse voltage at the drive transformer 11. However, in the seventh embodiment, an external capacitor is disposed as a capacitor producing a pulse voltage at a drive transformer 11.

In other words, in the seventh embodiment, a series circuit comprising the primary coil 11a of the drive transformer 11 and an external capacitor 31 is connected in parallel to the input capacitance of a main switching element 2. In addition, the series circuit of the primary coil 11a of the drive transformer 11 and the external capacitor 31 forms an LC resonant circuit. The cathode of a diode 13 is connected to the end for starting winding the primary coil 11a, and the anode thereof is connected to the end for finishing winding the primary coil 11a. The other structural parts are the same as those in the first embodiment, and with the same circuit operation as that in the first embodiment, the same advantage as that in the first embodiment can be obtained in the seventh embodiment. In the circuit used in this embodiment, the formation of the secondary-side circuit of the main transformer 4 can be the same as the secondary-side circuits shown in FIGS. 4, 6, and 8.

The circuit used in each of the embodiments described above has two transformers including the main transformer 4 and the drive transformer 11. Although the two transformers can be individual transformers by using separate cores, it is also possible to form the main transformer 4 and the drive transformer 11 by using a single common core.

When the two transformers 4 and 11 are formed by using a single core to wind, in order to reduce the size of the device, it is preferable to reduce the number of turns of the drive transformer 11. Furthermore, when a pattern of a core and a coil is printed on a substrate to form two transformers thereon by using a common core, since there are specification constraints in the width of the coil pattern and the space between the patterns, an increase in the number of coil patterns leads to increase in the size of the transformer. Thus, when the two transformers 4 and 11 are formed on the substrate, it is preferable to reduce the number of turns of the coil patterns of the drive transformer 11.

However, when the number of turns for winding the drive transformer 11 and the number of turns of patterns thereof are reduced, the excitation inductance of the drive transformer is smaller. For example, when the switching frequency of the main switching element 2 is a frequency less than 1 MHZ such as a few hundreds KHz, it is difficult to transmit such a low-frequency signal from the primary side of the drive transformer 11 to the secondary side thereof.

In this respect, the first to sixth embodiments use the input capacitance of the main switching element 2, and the seventh embodiment uses the capacitor 31 to form a series LC resonant circuit with the primary coil 11a of the drive transformer 11. With the form of a pulse having a narrow width, in other words, by converting a signal into the form of a high-frequency pulse, the signal is transmitted from the primary side of the drive transformer 11 to the secondary side thereof. Therefore, even in the case of an operation in which the switching frequency of the main switching element 2 is set to be a low frequency less than 1 MHZ, for example, 500 KHz, it is possible to transmit a reset pulse from the primary side of the drive transformer 11 to the secondary side thereof smoothly with reliability.

Accordingly, with the circuit structure of each embodiment described above, the main transformer 4 and the drive transformer 11 can be formed by using a single common core and the number of coils of the drive transformer 11 can be reduced so that a compact device can be produced at low cost, with a minimized space for disposing a transformer. In addition, while performing switching operations at low frequencies, the pulse of the drive transformer 11 can be transmitted to the early-off drive circuit 30 without fail so that the timing for turning off the commutating-side synchronous rectifier 6 can be accurately controlled, which can provide a substantial advantage.

The present invention is not restricted to the above embodiments, and it can adopt various modifications. For example, circuit structures having various combinations of patterns can be used by changing a combination of the primary circuit and the secondary circuit of the main transformer 4 (adding changes in the circuitry when necessary under the circumstances) as shown in each embodiment described above.

Furthermore, in each of the embodiments above, the timing for turning off the commutating-side synchronous rectifier 6 is set to be placed before the turn-on of the main switching element 2. However, as long as the timing is placed before a drain voltage occurs at the commutating-side synchronous rectifier 6, any timing is adaptable. (Regarding the drain voltage of the commutating-side synchronous rectifier 6, a positive voltage occurs a few tens of nano seconds later after the turn-on of the main switching element 2.)

More specifically, for example, there is a time lag of about 20 nano seconds by the time the drive transformer 11 is excited to output a reset pulse after outputting of an ON signal of a control pulse from the PWM controlling circuit 12, and there is, for example, a time lag of about 20 nano seconds by the time the drive switching element 7 is turned on after receiving the reset pulse (by the time the input capacitance of the drive switching element 7 is charged). In addition, for example, there is a time lag of about 20 nano seconds by the time the charge of the input capacitance of the commutating-side synchronous rectifier 6 is released to turn off the synchronous rectifier 6 after the turn-on of the drive-switching element 7.

Meanwhile, there is a time lag of a few tens of nano seconds by the time the input capacitance of the main switching element 2 is charged to turn on the main switching element 2 after outputting of an ON-signal of a control pulse from the PWM controlling circuit 12, and there is a time lag of a few tens of nano seconds due to the leakage inductance of the transformer by the time the main transformer 4 is excited and the drain voltage of the commutating-side synchronous rectifier 6 thereby appears at the secondary coil 4b after the turn-on of the main switching element 2.

As a result, when the time lag occurring by the time the commutating-side synchronous rectifier 6 is turned off after outputting of the ON-signal from the PWM controlling circuit 12 is designed to be less than the time lag occurring by the time the drain voltage of the secondary coil 4b appears at the commutating-side synchronous rectifier 6 after outputting of the ON-signal from the PWM controlling circuit 12, the commutating-side synchronous rectifier 6 can be turned off before the rectifying-side synchronous rectifier 5 is turned on. With this arrangement, the occurrence of short-circuit current due to the delay in turning off the commutating-side synchronous rectifier 6 can be prevented with reliability.

Furthermore, in each of the above embodiments, although each of the switching elements shown for the main switching element 2, the synchronous rectifiers 5 and 6, the drive switching element 7 is an N-channel MOS FET, other kinds of switching elements such as a P-channel MOS FET, a bipolar transistor, and an IGBT can also be used.

Furthermore, a diode can be used for the rectifying-side synchronous rectifier 5 in each of the above embodiments.

Furthermore, in each of the above-described embodiments, the circuit of a single-output DC—DC converter is illustrated as an example. However, an isolating DC—DC converter of the present invention may be an isolating DC—DC converter with multiple outputs (two or more outputs).

Figure 10:
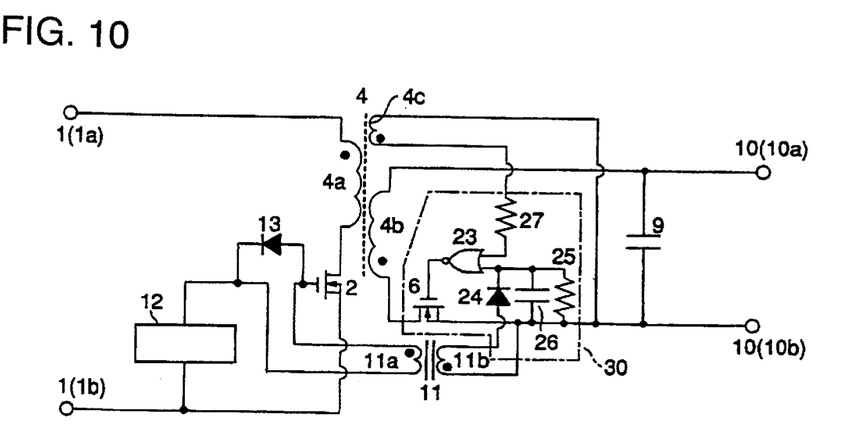
FIG. 10 is a circuit diagram of an isolating DC—DC converter of a flyback-converter type.

Furthermore, in each of the embodiments described above, although the example of an isolating DC—DC converter of a resonance reset forward converter type is illustrated, the present invention can be applied to an isolating DC—DC converter of a flyback converter type. FIG. 10 shows an example. The circuit shown in FIG. 10 is an isolating DC—DC converter of a flyback converter type with a current serial mode. This circuit has a structure in which the circuit of the early-off drive circuit 30 of a resonance reset forward converter type used in the sixth embodiment shown in FIG. 8 is incorporated in an isolating DC—DC converter of a flyback converter type, where the same reference numerals are given to the same circuit elements as those in the circuits of the embodiments described above.

The circuit shown in FIG. 10 performs circuit operations in such a manner that when the main switching element 2 is in an ON-period state, electromagnetic energy is charged at the primary coil 4a of the main transformer 4, and when the main switching element 2 is turned off, the charged energy is coupled to the secondary side of the main transformer 4.

The circuit shown in FIG. 10 can also prevent reduction of circuit efficiency and the occurrence of noise due to a delay in turning off the synchronous rectifier 6 by turning off the synchronous rectifier 6 before the main switching element 2 is turned on.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An isolating type DC—DC converter comprising a main transformer isolating a primary-side circuit and a secondary-side circuit, a main switching element disposed in the primary-side circuit, the main switching element being turned on/off by charging and discharging an input capacitance by a control pulse, and at least one synchronous rectifier disposed in the secondary-side circuit, the synchronous rectifier being turned off by synchronizing to the turn-on of the main switching element, wherein the turn-on of the main switching element and the turn-off of the synchronous rectifier are synchronized, and the turn-on/off of the main switching element allows energy to be coupled from the primary-side circuit to the secondary-side circuit, the secondary side circuit rectifying and smoothing the energy so that a DC voltage is outputted from an output end; and further comprising a drive transformer, a primary coil of the drive transformer being connected to a path for charging the input capacitance of the main switching element, and further comprising an early-off drive circuit for the synchronous rectifier disposed on a secondary side of the drive transformer for turning off the synchronous rectifier before the input capacitance of the main switching element is charged to turn on the main switching element when the main switching element is provided with the control pulse, by using a secondary-side output of the drive transformer.

2. The isolating DC—DC converter of claim 1, wherein a turn-on signal for the synchronous rectifier turned off by the early-off drive circuit is supplied by a reset pulse of the main transformer.

3. The isolating DC—DC converter of claim 1, wherein a totem-pole circuit formed by connecting the emitter of an npn transistor to the emitter of a pnp transistor is disposed in a path for supplying a control pulse to the main switching element, the bases of the transistors being control-pulse supplying sources; an auxiliary power supply being connected to one-end side of the primary coil of the drive transformer to form a charging path by using a path extending from the auxiliary power supply to the input capacitance of the main switching element via the primary coil of the drive transformer and the npn transistor of the totem-pole circuit, the totem-pole circuit amplifying an output from the auxiliary power supply to be supplied to the primary coil of the drive transformer when a control pulse to turn on the main switching element is provided.

4. The isolating DC—DC converter of claim 2, wherein a totem-pole circuit formed by connecting the emitter of an npn transistor to the emitter of a pnp transistor is disposed in a path for supplying a control pulse to the main switching element, the bases of the transistors being control-pulse supplying sources; an auxiliary power supply being connected to one-end side of the primary coil of the drive transformer to form a charging path by using a path extending from the auxiliary power supply to the input capacitance of the main switching element via the primary coil of the drive transformer and the npn transistor of the totem-pole circuit, the totem-pole circuit amplifying an output from the auxiliary power supply to be supplied to the primary coil of the drive transformer when a control pulse to turn on the main switching element is provided.

5. The isolating DC—DC converter of claim 1, wherein the synchronous rectifier is a switching element turned on and off by charging and discharging an input capacitance; and the early-off drive circuit comprises a drive-switching element disposed in a path for discharging the input capacitance of the synchronous rectifier to turn off the synchronous rectifier by discharging the input capacitance of the synchronous rectifier when switched on, and a pulse-width expanding circuit for sending a pulse output of the secondary coil of the drive transformer, outputted when the main switching element is turned on, to the drive switching element as a switching-on drive signal by expanding the on-period of the main switching element.

6. The isolating DC—DC converter of claim 2, wherein the synchronous rectifier is a switching element turned on and off by charging and discharging an input capacitance; and the early-off drive circuit comprises a drive-switching element disposed in a path for discharging the input capacitance of the synchronous rectifier to turn off the synchronous rectifier by discharging the input capacitance of the synchronous rectifier when switched on, and a pulse-width expanding circuit for sending a pulse output of the secondary coil of the drive transformer, outputted when the main switching element is turned on, to the drive switching element as a switching-on drive signal by expanding the on-period of the main switching element.

7. The isolating DC—DC converter of claim 1, wherein the path for charging the input capacitance of the main switching element is connected to an instantaneous short-circuit operation circuit for instantaneously short-circuiting the input capacitance of the main switching element before the turn-on of the main switching element when turned on to increase a voltage supplied to the primary coil of the drive transformer so that the output of the drive transformer is boosted.

8. The isolating DC—DC converter of claim 2, wherein the path for charging the input capacitance of the main switching element is connected to an instantaneous short-circuit operation circuit for instantaneously short-circuiting the input capacitance of the main switching element before the turn-on of the main switching element when turned on to increase a voltage supplied to the primary coil of the drive transformer so that the output of the drive transformer is boosted.

9. The isolating DC—DC converter of claim 1, wherein the early-off drive circuit comprises a logic circuit for converting a pulse signal outputted from the drive transformer when the main switching element is turned on into a signal turning off the synchronous rectifier.

10. The isolating DC—DC converter of claim 2, wherein the early-off drive circuit comprises a logic circuit for converting a pulse signal outputted from the drive transformer when the main switching element is turned on into a signal turning off the synchronous rectifier.

11. The isolating DC—DC connector of claim 5, wherein the synchronous rectifier comprises a commutating synchronous rectifier disposed so as to provide a short circuit path across a secondary winding of the main transformer at selected times.

12. The isolating DC—DC connector of claim 6, wherein the synchronous rectifier comprises a commutating synchronous rectifier disposed so as to provide a short circuit path across a secondary winding of the main transformer at selected times.

13. The isolating DC—DC converter of claim 11, further comprising a further synchronous rectifier comprising a rectifying synchronous rectifier disposed in series with the secondary winding of the main transformer, the commutating synchronous rectifier being disposed in parallel to the series circuit comprising the secondary winding of the main transformer and the rectifying synchronous rectifier.

14. The isolating DC—DC converter of claim 12, further comprising a further synchronous rectifier comprising a rectifying synchronous rectifier disposed in series with the secondary winding of the main transformer, the commutating synchronous rectifier being disposed in parallel to the series circuit comprising the secondary winding of the main transformer and the rectifying synchronous rectifier.

15. An isolating DC—DC converter comprising a main transformer isolating a primary-side circuit and a secondary-side circuit, a main switching element disposed in the primary-side circuit, the main switching element being turned on/off by charging and discharging an input capacitance by a control pulse, and at least one synchronous rectifier disposed in the secondary-side circuit, the synchronous rectifier being turned off by synchronizing to the turn-on of the main switching element, wherein the turn-on of the main switching element and the turn-off of the synchronous rectifier are synchronized, and the turn on/off of the main switching element allows energy to be coupled from the primary-side circuit to the secondary-side circuit, the secondary side circuit rectifying and smoothing the energy so that a DC voltage is outputted from an output end; and further comprising a series circuit comprising a primary coil of a drive transformer and a capacitor connected to a path for charging the input capacitance of the main switching element in parallel to the input capacitance of the main switching element, and further comprising an early-off drive circuit for the synchronous rectifier disposed on a secondary side of the drive transformer to turn off the synchronous rectifier before the input capacitance of the main switching element is charged to turn on the main switching element when the main switching element is provided with the control pulse, by using a secondary-side output of the drive transformer.

* * * * *